Dec. 11, 1928.
E. B. FLANIGAN
VEHICLE BRAKE
Filed June 16, 1926
1,694,776
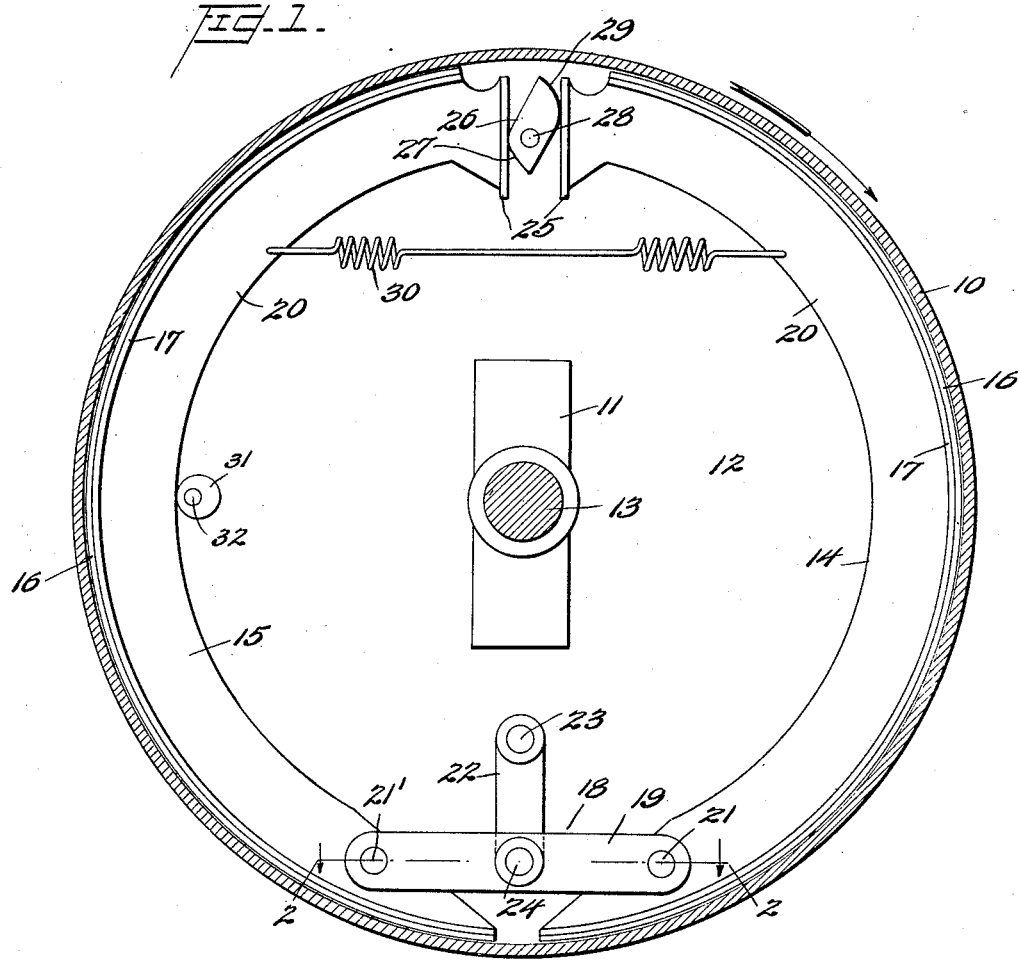
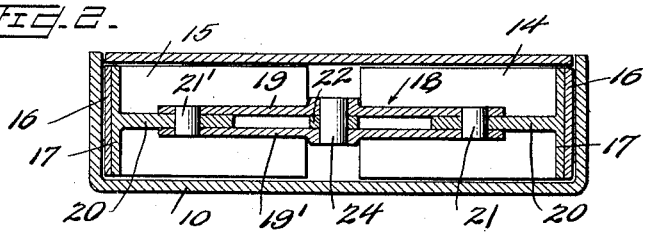
Inventor
By E. B. Flanigan,
Watson, Coit, Moree & Grindle,
Attorney Patented Dec. 11, 1928.

1,694,776

UNITED STATES PATENT OFFICE.

EDWIN B. FLANIGAN, OF WILKES-BARRE, PENNSYLVANIA, ASSIGNOR TO E. B. FLANIGAN, INCORPORATED, OF WILKES-BARRE, PENNSYLVANIA, A CORPORATION OF PENNSYLVANIA.

VEHICLE BRAKE.

Application filed June 16, 1926. Serial No. 116,451.

This invention relates to vehicle brakes and more particularly to brakes for automotive vehicles.

It is a general object of the present invention to provide a novel and improved vehicle brake.

More particularly it is an object of the present invention to provide a two-shoe, reversible, servo or self-actuating brake which can be used with the operating or expanding means at the top, thus adapting it particularly for use with front wheel brakes.

A further object of the present invention consists in the provision of a servo-brake provided with two shoes or bands connected together in their lower ends by a solid link and supported from the brake plate or spider by a second link pivoted to said first mentioned link and spider.

A still further object of the present invention consists in the provision of a two-shoe, servo-brake in which the expanding means serves to force one shoe into engagement with the drum and that shoe, thru a link, forces the other shoe into engagement with the drum, thus making use of the energy of the rotating drum to apply the major part of the effort necessary to actuate said brake, means being provided to substantially prevent any reaction of the second shoe on the the operative means.

Other and further objects will be more apparent to those skilled in the art by a consideration of the accompanying drawing and following specification, wherein is disclosed a single exemplary embodiment of the invention, with the understanding, however, that various changes may be made therein without departing from the spirit of the invention or the scope of the appended claims.

In said drawings:

Figure 1 is a side elevation of a vehicle brake constructed according to the present invention, the wheel being removed and the axle stub and brake drum being shown in section; and Figure 2 is a horizontal section on line 2—2 of Fig. 1.

Vehicle brakes which are satisfactory for use on the rear wheels of an automotive vehicle are often unsuited for use on the front wheels. Satisfactory operation of front wheel brakes usually requires the actuating element or cam to be at the top in order that the actuating shaft may have a universal joint directly above the axis of the steering spindle in order to accommodate movement of the front wheels in steering. Most internal expanding brakes as applied to rear wheels depend to some extent on the cam or other actuating means for holding up the upper shoe from which the lower shoe is supported by springs or other suitable resilient means out of contact with the brake drum when the brake is released. When the brake is rotated thru an angle of 90° to place the cam or other actuating means at the top then this support is removed and other means must be adopted to prevent the shoes from sagging and dragging on the drum. The present invention contemplates the provision of means for doing this and at the same time for giving a servo action to a two-shoe reversible brake.

Referring to the drawings, there is disclosed at 10 a brake drum adapted to be secured in the usual manner to the vehicle wheel. At 11 is shown a portion of the steering knuckle on which is rigidly mounted the enclosing brake plate or spider 12 acting as a support and journal for the various brake parts and as a cover to keep out foreign matter. The wheel, which is not shown, is journaled on the spindle 13 extending from the steering knuckle mechanism. The brake proper comprises two shoes 14 and 15 substantially concentric with the drum. Thruout the specification and claims the word "shoe" is intended to mean not only a rigid brake member but also a more or less resilient and flexible one of the band type, since internal shoes and bands are both in common use. Each of the shoes is slightly less than a semicircle of a radius substantially the same as the interior radius of the brake drum, and each may be provided with a suitable friction lining 16 such as is well known. Each shoe is in cross section preferably, T-shaped, the head of the T 17 carrying the friction lining 16 and the stem or web 20 of the T extending radially inwardly.

The lower ends of the two shoes are slightly spaced apart and their webs are securely connected together by means of the link 18 which is formed in two parts by the plates 19, 19', one resting on each side of the web portion 20 of each shoe, as best shown in Fig. 2. Suitable pivots 21, 21' pass thru the plates 19, 19' and the webs 20, so that the link 18 is pivoted to each brake shoe. The link 18 is suspended from the brake spider or plate 12 by means of a second link 22 pivoted at 23 to a stud projecting from the brake plate and at 24 to the center of the link 18. The link 22 is a single plate substantially the same thickness as the webs 20 and it passes between the plates 19 and 19' and is pivoted thereto as shown at 24 in Fig. 2. It will thus be seen that the brake shoes are suspended from the brake plate or spider by means of the two links 18 and 22. They are balanced and are thus prevented from sagging and dragging on the brake drum, but are enabled to move in relation to the drum in a limited degree.

At the upper end the webs of the brake shoes 14 and 15 are provided with the substantially radial cam followers 25 having flat faces adapted to be engaged by the cam 26, mounted on the shaft 28 passing thru and journaled in the cover plate 12.

While any suitable means of expanding the brake shoes may be used, it is preferred to use the differential cam disclosed in my copending application Serial No. 83,258, filed January 23, 1926. From this application it may be ascertained that the cam has a face 27 which is almost concentric with the operating shaft 28 of the cam and serves to move the shoe 15 but slightly when the cam is rotated in a clockwise direction. The other face 29 of the cam, however, is much more eccentric and upon rotation of the cam about its shaft imparts greater movement to the shoe 14. When the vehicle is running in a forward direction, the brake drum rotates in the direction of the arrow, or clockwise. Upon pressure on the brake pedal motion will be transmitted to the cam to rotate the same in a clockwise direction and move the upper end of the shoe 14 into engagement with the brake drum 10. In so doing the shoe rotates about the pivot 21. Further movement of the cam causes a slight tilting of the link 18 in a clockwise direction until full contact of the shoe 14 is obtained with the drum. The shoe 14 is then partially rotated with the brake drum, due to the adherence between these two parts, and applies a force along the link 18 which moves then about the pivot 23 and forces the shoe 15 into engagement with the drum. At the same time the upper end of the shoe 15 has been slightly moved due to the small eccentricity of the face 27 of the cam so that full contact of this shoe is also assured. The cam follower 25 on the shoe 15 is forced against the face 27 of the cam by the action of the brake drum on the brake shoes and it acts also, therefore, as a brake stop, but owing to the slight eccentricity of the cam face 27 offers but little effort to close up the cam against the operator's foot, as would be the case should a conventional two-lobed cam be used.

A release spring 30 is connected between the webs of the brake shoes 14 and 15 a material distance above the steering knuckle as shown, and this spring is of adequate strength to assure clearance of the brake shoes when the cam is returned to its normal position. The brakes are initially adjusted by properly positioning the link 22, which may be made adjustable: so that the bottoms of the shoes just clear the drum when the brake is released and the upper arcs of the shoes just clear the drum when the cam is in its normal position. For close adjustment an eccentric 31 may be mounted on a pivot 32 secured to the brake spider so that the shoe 15 may be adjusted to the desired clearance in relation to the drum by the proper adjustment of this eccentric which may then be locked in position by any suitable means. This insures against flopping and grabbing when the brake is applied.

It will thus be seen that upon application of the brake full contact of each shoe is assured, and also that the shoes are self-adjusting and even after wear will always assume the proper position to assure full contact. The servo action of the brake is of extreme importance, for it reduces the amount of pedal pressure necessary to apply the brakes. It will be evident that when the brake shoe 14 adheres to the drum 10 the energy of the rotating drum causes this shoe to apply an axial effort along the link 18 to thus automatically press the shoe 15 into engagement with the drum. In so doing pressure on the cam face 29 is partially relieved and but slight pedal pressure is necessary. The brake, however, releases instantly upon the backward rotation of the cam and there is no shock upon its application. By reason of the brake shoes being supported by the link 22 and the link 18, they are kept out of contact with the lower portion of the brake drum and the spring 30 keeps the cam followers 25 tightly against the cam, thus maintaining the upper parts of the shoes out of engagement with the drum, when the brake is released, and thus positive clearance is assured all around.

The operation of the brake when the vehicle is backing is substantially the same as that occurring during forward movement but there is more tendency to close up the cam against the pedal pressure since the most eccentric part of the cam acts as the stop.

The brake is not only reversible in operation but all of the parts are reversible and can be assembled on either side of the vehicle interchangeably.

Having thus described the invention, what is claimed as new and desired to be secured by Letters Patent is:

1. In a vehicle brake, in combination, a brake drum, rotatably mounted, a relatively stationary brake plate, a pair of brake shoes concentric with said drum and arranged with adjacent ends at the bottom of said drum, a link pivoted to said adjacent ends and connecting the same together, said link being substantially horizontal, a second link pivoted near the center of said first link and to said brake plate to support said brake shoes from said plate, a differential cam between the opposite ends of said shoes, a release spring connecting said shoes near said cam, and an eccentric rotatably mounted on said plate and engaging one of said shoes to adjust the clearance of the same from said drum when released.

2. In a vehicle brake, in combination, a brake drum rotatably mounted, a relatively stationary brake spider, a pair of brake members concentric with said drum and one on either side of the vertical diameter of said drum, a link having its ends pivoted near the bottom end of each member and connecting the same together, a second link pivoted to said spider and to an intermediate portion of said first link expanding means to actuate the opposite ends of said members and a release spring for said members.

3. In a vehicle brake, in combination, a brake drum mounted for rotation, a brake spider stationary in respect to said drum, a link having one end pivoted to said spider, a second link pivoted intermediate its ends to the other end of said first link, a pair of brake members each having its lower end pivoted to said second link, the members being supported by said links, and expanding means acting on the upper ends of said members, said means being adapted to act as a stop for said members.

4. In a vehicle brake, in combination, a brake drum mounted for rotation, a brake spider stationary in respect to said drum, a pair of interchangeable arcuate brake shoes mounted within and concentric with said drum and one on either side of the vertical center thereof, a pair of connected links arranged as an inverted T and supported from said spider, said shoes having their lower ends pivoted to one of said links whereby the shoes are supported from the spider, a shaft journaled in said spider, a cam thereon, cam follower faces on said shoes adapted to engage said cam and spring means to press said faces against said cam.

5. In a vehicle brake, in combination, a brake drum rotatively mounted, a relatively stationary brake spider, a pair of brake shoes concentric with said drum, a link pivoted to adjacent ends of said shoes and connecting the same together, a second link pivoted to said spider and to an intermediate portion of said first link, and expanding means to actuate the opposite ends of said shoes.

In testimony whereof I hereunto affix my signature.

EDWIN B. FLANIGAN.